(12) United States Patent
Deng et al.

(10) Patent No.: US 9,466,322 B2
(45) Date of Patent: Oct. 11, 2016

(54) ULTRA-LOW PROFILE MULTIDENTATE LUBRICANT FOR USE AS A SUB-NANOMETER THICK LUBRICANT LAYER FOR MAGNETIC MEDIA

(71) Applicant: HGST Netherlands B.V., Amsterdam (NL)

(72) Inventors: Hong Deng, San Jose, CA (US); Xing-Cai Guo, Tracy, CA (US); Bruno Marchon, Palo Alto, CA (US); Bala K. Pathem, Fremont, CA (US); Robert Waltman, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 45 days.

(21) Appl. No.: 14/185,153

(22) Filed: Feb. 20, 2014

(65) Prior Publication Data

US 2015/0235664 A1    Aug. 20, 2015

(51) Int. Cl.
*G11B 5/725*   (2006.01)
*G11B 5/84*    (2006.01)
*C10M 145/24*  (2006.01)

(52) U.S. Cl.
CPC ............ *G11B 5/725* (2013.01); *C10M 145/24* (2013.01); *G11B 5/8408* (2013.01)

(58) Field of Classification Search
CPC .......... G11B 5/62; G11B 5/72; G11B 5/725; C10M 145/24
USPC ............. 360/135; 508/588; 428/835.8, 833.3
See application file for complete search history.

(56) References Cited

U.S. PATENT DOCUMENTS

| 5,331,487 | A | 7/1994 | Gregory et al. |
| 5,718,942 | A | 2/1998 | Vurens et al. |
| 6,099,937 | A | 8/2000 | Gui et al. |
| 7,354,666 | B2 | 4/2008 | Liu et al. |
| 7,683,012 | B2 | 3/2010 | Burns et al. |
| 7,943,558 | B2 | 5/2011 | Burns et al. |
| 7,968,505 | B2 | 6/2011 | Liu et al. |
| 8,518,564 | B2 * | 8/2013 | Burns et al. ............... 428/835.8 |
| 8,623,800 | B2 * | 1/2014 | Ooeda et al. ................. 508/582 |
| 9,045,711 | B2 * | 6/2015 | Deng ................... C10M 131/10 |
| 9,177,586 | B2 * | 11/2015 | Shimokawa ......... C10M 107/38 |
| 2005/0037932 | A1 | 2/2005 | Liu et al. |

(Continued)

OTHER PUBLICATIONS

Guo et al., "A multidentate lubricant for use in hard disk drives at sub-nanometer thickness," Journal of Applied Physics, vol. 111, No. 2, Jan. 2012, pp. 024503/1-024503/7, abstract only.

(Continued)

*Primary Examiner* — Jefferson Evans
(74) *Attorney, Agent, or Firm* — Zilka-Kotab, PC

(57) ABSTRACT

According to one embodiment, a lubricant includes a multidentate perfluoropolyether having a chemical structure of: $R_e$—$R_z$—$R_i$—$R_z$—$R_i$—$R_z$—$R_e$, where $R_z$ includes at least one perfluoroethyl ether unit, and where $R_e$ and $R_i$ each include at least one functional group configured to attach to a surface. According to another embodiment, the aforementioned lubricant may be suitable for use in a sub-nanometer thick lubricant layer for various applications, and particularly useful for magnetic recording media.

24 Claims, 16 Drawing Sheets

(56) References Cited

U.S. PATENT DOCUMENTS

| | | | |
|---|---|---|---|
| 2007/0060487 A1* | 3/2007 | Burns et al. | 508/582 |
| 2007/0225183 A1* | 9/2007 | Sasa et al. | 508/582 |
| 2008/0132664 A1* | 6/2008 | Shirakawa et al. | 526/247 |
| 2008/0176106 A1* | 7/2008 | Guo et al. | 428/800 |
| 2009/0075123 A1* | 3/2009 | Liu et al. | 428/833.3 |
| 2009/0154010 A1* | 6/2009 | Ooeda et al. | 360/110 |
| 2010/0069275 A1* | 3/2010 | Marchionni et al. | 508/582 |
| 2010/0240559 A1* | 9/2010 | Shirakawa | 508/582 |
| 2010/0266754 A1* | 10/2010 | Brown | G11B 5/8408 427/127 |
| 2011/0256424 A1* | 10/2011 | Burns | C08G 65/007 428/814 |
| 2012/0021253 A1 | 1/2012 | Nakata et al. | |
| 2012/0282491 A1* | 11/2012 | Burns | C10M 107/38 428/814 |
| 2013/0157082 A1* | 6/2013 | Deng et al. | 428/800 |
| 2015/0218480 A1* | 8/2015 | Xu | C07F 9/65815 508/422 |
| 2015/0275046 A1* | 10/2015 | Yamane | C03C 17/30 428/429 |
| 2016/0068778 A1* | 3/2016 | Conley | C10M 107/38 360/75 |

OTHER PUBLICATIONS

Marchon et al., "Fomblin Multidentate Lubricants for Ultra-low Magnetic Spacing," Magnetics Conference, 2006, INTERMAG 2006, IEEE International, May 8-12, 2006, pp. 416, abstract only.

Kawaguchi et al., "An effect of dewetting of lubricated surfaces on friction and wear properties," Journal of Applied Physics, vol. 97, No. 10, May 2005, pp. 10P311/1-10P311/3, abstract only.

Ma et al., "Lubricant transfer from disk to slider in hard disk drives," Applied Physics Leters, vol. 90, No. 14, Apr. 2007, pp. 143516/1-143516/3, abstract only.

Guo et al., "Mulidentate functionalized lubricant for ultralow head/disk spacing in a disk drive," Journal of Applied Physics, vol. 100, Issue 4, Aug. 2006, pp. 044306/1-044306/8, abstract only.

* cited by examiner

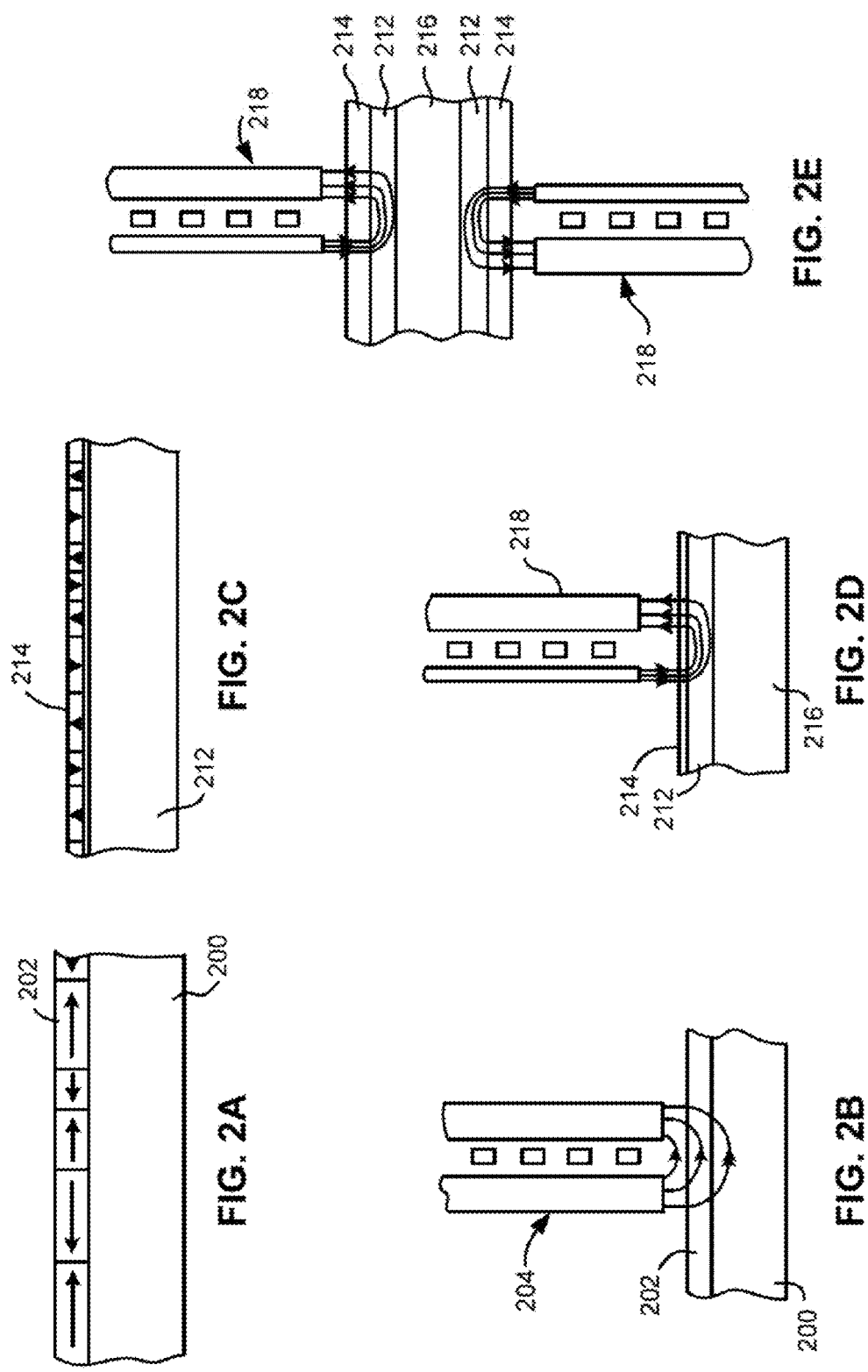

ULTRA-LOW PROFILE MULTIDENTATE LUBRICANT FOR USE AS A SUB-NANOMETER THICK LUBRICANT LAYER FOR MAGNETIC MEDIA

FIELD OF THE INVENTION

The present invention relates to lubricants, and more particularly, this invention relates to ultra-low profile multidentate lubricants suitable for use as sub-nanometer thick lubricant layers for various applications, and particularly useful for magnetic recording media.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to meet this desire is to increase the capacity by increasing the recording density of the HDD. To achieve higher recording density, further miniaturization of recording bits is effective, which in turn typically requires the design of smaller and smaller components. This reduction in component size is aided by the ability to maintain the reading and writing elements in a magnetic head in a position closer to the magnetic recording layer of the magnetic medium. This distance between the reading and writing elements and the magnetic recording layer is referred to as the magnetic spacing.

Narrowing the magnetic spacing is a very effective method for improving the recording density of a magnetic recording device, such as a HDD. Reducing the clearance, which is defined as the gap between the lowest point (farthest protruding portion at the ABS) of the magnetic head and the uppermost surface of the magnetic medium has been attempted to reduce the magnetic spacing. A technique used in magnetic recording devices to reduce this clearance relies on thermal expansion of one or more portions of the magnetic head. This thermal expansion is caused by a heater which is positioned near one or more elements of the magnetic head such that applying current to this heater controls the expansion of the one or more portions of the magnetic head to provide a smaller head-to-medium clearance.

However, a smaller clearance may also lead to undesirable interactions between the slider and a lubricant layer of the magnetic medium. Such slider-lubricant interactions may create moguls, ripples, depletions, etc. in the lubricant. Slider-lubricant interactions may also cause the lubricant to accumulate on the leading edge of the slider, thereby negatively affecting the performance of the read and write heads. Moreover, the lubricant accumulated on the leading edge of the slider may fall back onto the magnetic medium's surface, resulting in a lubricant layer having non-uniform thickness. Unfortunately, a non-uniform lubricant layer (e.g. a lubricant layer including moguls, ripples, thicker regions, etc.) may lead to errors during read and/or write operation, as well as allow scratching of the magnetic medium's surface in regions with little to no lubricant.

SUMMARY

According to one embodiment, a lubricant includes a multidentate perfluoropolyether having a chemical structure of: $R_e$—$R_z$—$R_i$—$R_z$—$R_i$—$R_z$—$R_e$, where $R_z$ includes at least one perfluoroethyl ether unit, and where $R_e$ and $R_i$ each include at least one functional group configured to attach to a surface.

According to another embodiment, a magnetic medium includes a magnetic recording layer positioned above a non-magnetic substrate; a protective overcoat positioned above the magnetic recording layer; and a lubricant layer positioned above the protective overcoat. The lubricant layer includes a multidentate perfluoropolyether having a chemical structure of: $R_e$—$R_z$—$R_i$—$R_z$—$R_i$—$R_z$—$R_e$, where $R_z$ includes at least one perfluoroethyl ether unit, and where $R_e$ and $R_i$ each include at least one functional group configured to attach to a surface.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 Å refers to a thickness of 10 Å±1 Å.

The following description discloses several preferred embodiments of disk-based storage systems and/or related systems and methods, as well as operation and/or component parts thereof.

In one general embodiment, a lubricant includes a multidentate perfluoropolyether having a chemical structure of: $R_e—R_z—R_i—R_z—R_i—R_z—R_e$, where $R_z$ includes at least one perfluoroethyl ether unit, and where $R_e$ and $R_i$ each include at least one functional group configured to attach to a surface.

In another general embodiment, a magnetic medium includes a magnetic recording layer positioned above a non-magnetic substrate; a protective overcoat positioned above the magnetic recording layer; and a lubricant layer positioned above the protective overcoat. The lubricant layer includes a multidentate perfluoropolyether having a chemical structure of: $R_e—R_z—R_i—R_z—R_i—R_z—R_e$, where $R_z$ includes at least one perfluoroethyl ether unit, and where $R_e$ and $R_i$ each include at least one functional group configured to attach to a surface.

Figure 1:
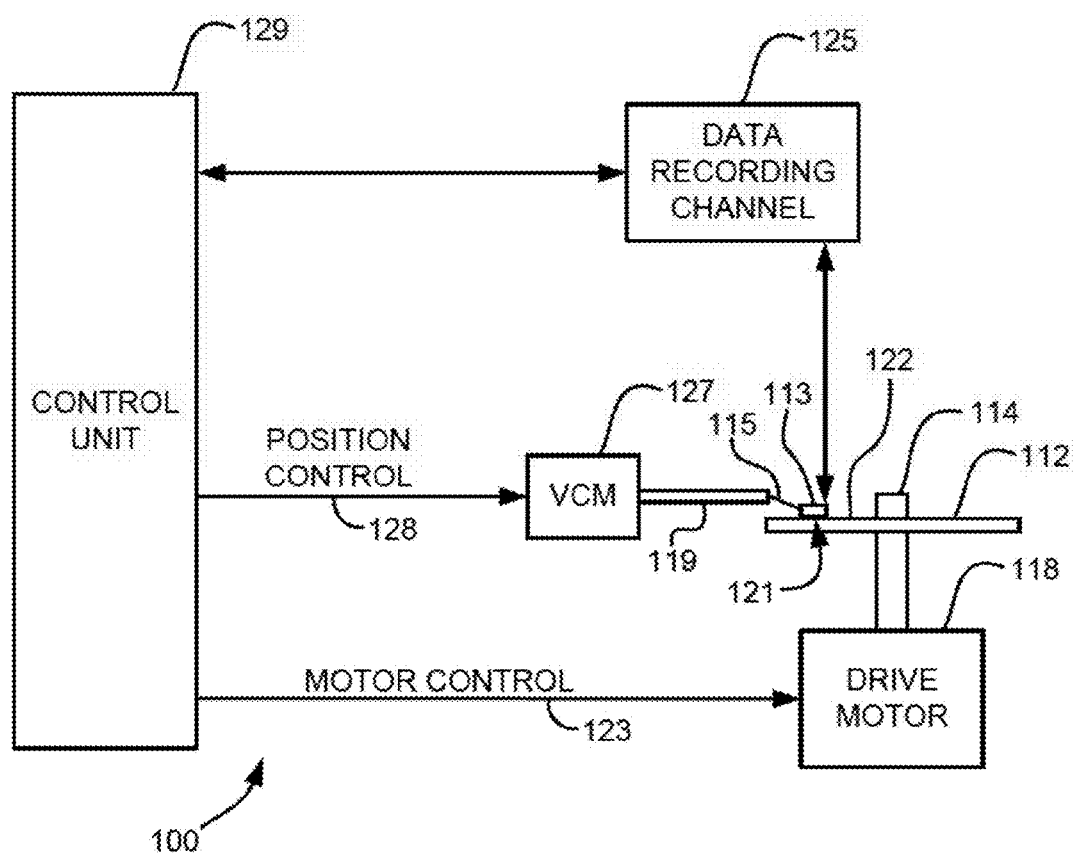
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
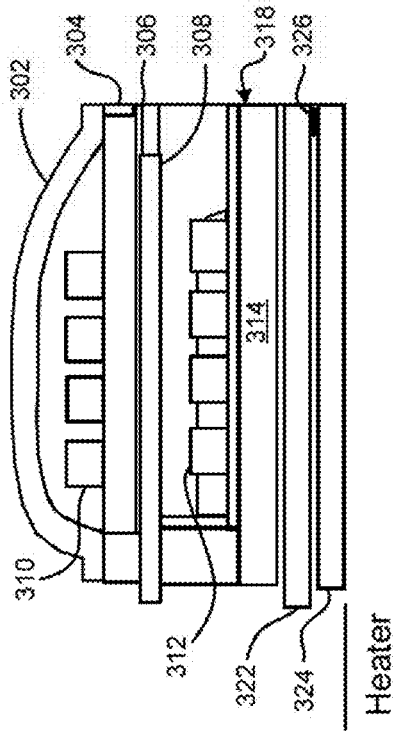
FIG. 3B is a cross-sectional view of one particular embodiment of a piggyback magnetic head with helical coils.
Figure 3A:
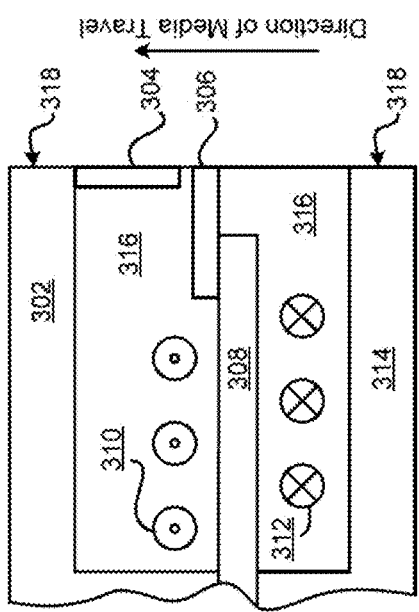
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
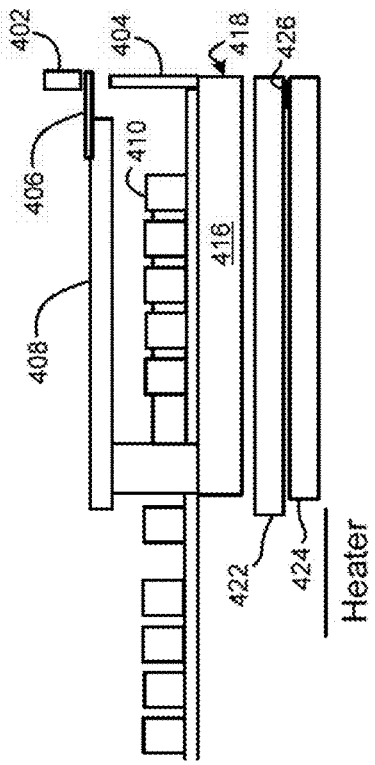
FIG. 4B is a cross-sectional view of one particular embodiment of a piggyback magnetic head with looped coils.
Figure 4A:
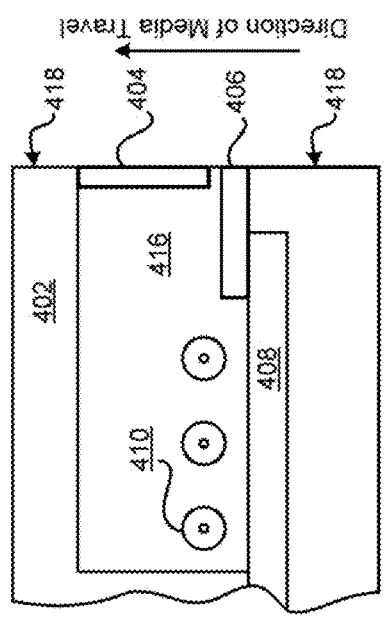
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

As discussed previously, lubricants, such as boundary lubricants, may be used in various mechanical devices, including magnetic hard disk drives and other microelectronic mechanical systems. Boundary lubricants may form a lubricant layer when one or more functional groups of the lubricant attach to the surface being lubricated. For instance, one or more boundary lubricants may form a lubricant layer on a magnetic medium (e.g. a magnetic disk) that moves relative to other parts in the mechanic device. This lubricant layer may help to protect the magnetic medium from frictional wear and/or damage caused by interactions between the magnetic medium and other parts in the mechanical device (e.g. slider-magnetic medium interactions). In other words, this boundary layer may help limit solid-to-solid contact.

Figure 5:
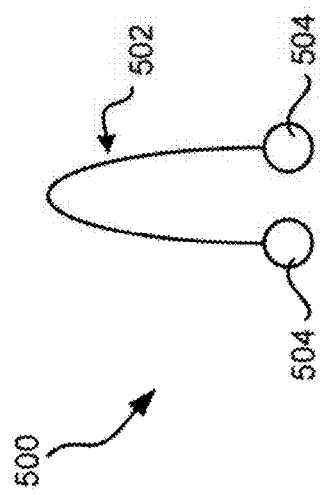
FIG. 5 is lubricant molecule having one main chain segment and two attachment segments, according to one embodiment.

FIG. 5 illustrates a boundary lubricant 500, according to one approach. As shown in FIG. 5, the boundary lubricant 500 includes a main chain segment 502, as well as attachment segments 504 positioned on either end of the main chain segment 502. A main chain segment may refer to a continuous segment/portion/part of a lubricant molecule that includes at least one perflouropolyalkyl ether unit according to various approaches. A main chain segment may also include, in addition to the at least one perflouropolyalkyl ether unit, one or more fluoroalkyl ether units and/or one or more alkyl ether units, according to more approaches. An attachment segment may refer to a continuous segment/portion/part of the lubricant that includes at least one functional group configured to attach to a surface to be lubricated according to yet more approaches.

Figure 6:
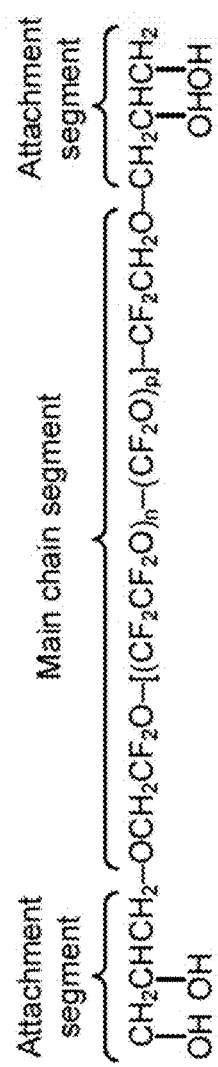
FIG. 6 is a representation of the molecular structure of Z-Tetraol.

One example of a boundary lubricant having the structure shown in FIG. 5 is Z-Tetraol. The molecular structure of Z-Tetraol is illustrated in FIG. 6, with annotations specifying the main chain and attachment segments. The "n" and "p" subscripts associated with the $-(CF_2CF_2O)_n-$ and $-(CF_2O)_p-$ units in the main chain segment shown in FIG. 6 each individually correspond to integers greater than zero.

Boundary lubricants having the structure shown in FIG. 5, such as Z-Tetraol, typically have a single, long, high molecular weight (MW) main chain segment. A high molecular weight may refer to a molecular weight greater than or equal to about 3000 amu, in various approaches. While a long, heavy main chain segment may be less prone to evaporation, it may create potential magnetic head-disk clearance issues. For example, a boundary lubricant having a long, high MW main chain segment, which is tethered to a surface at both ends by attachment segments, has multiple degrees of freedom that may allow a portion (e.g. a middle portion) of the main chain segment to lift up from the surface and interact with a magnetic head positioned above. Unfortunately, merely decreasing the molecular weight of the single main chain segment to achieve an improved head-disk clearance margin may inevitably lead to evaporation issues, as molecular weight inversely and exponentially varies with vapor pressure. Likewise, merely decreasing the molecular weight of the single main chain segment may also decrease the effective viscosity of the lubricant, which has a linear, inverse relationship with molecular weight, leading to possible spin-off issues.

Figure 7:
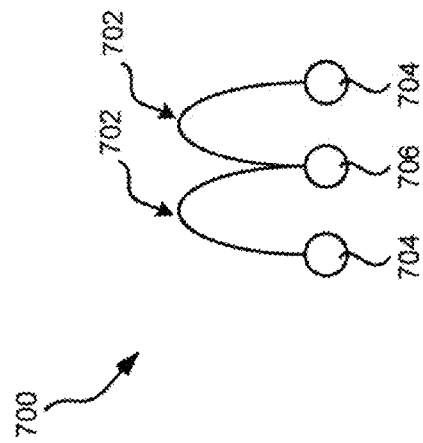
FIG. 7 is a lubricant molecule having two main chain segments and three attachment segments, according to one embodiment.

FIG. 7 illustrates another boundary lubricant 700, according to one approach. As shown in FIG. 7, the boundary lubricant 700 includes two main chain segments 702, each of which have the same molecular structure. The boundary lubricant 700 also includes two end attachments segments 704 and a middle attachment segment 706. Specifically, there is an end attachment segment 704 at one end of each main segment 702, and a middle attachment segment 706 at the other end of each main chain segment 702. In some approaches, the end and middle attachment segments 704, 706 may have the same or different molecular structures.

Each main chain segment in the boundary lubricant 700 may be shorter and have a lower MW as compared to the single main chain segment of a boundary lubricant having the structure shown in FIG. 5. For example, in one approach, each main chain segment 702 in the boundary lubricant 700 of FIG. 7 may have a MW that is approximately half of the MW of the main chain segment 502 of the boundary lubricant 500 shown in FIG. 5. Shorter and/or lighter main chain segments, tethered to a surface by end and/or middle attachment groups, may extend above the surface at a smaller height compared to a longer, heavier main chain segment, thereby improving head-disk clearance margin. Moreover, reducing the potential for head-disk interactions using a boundary lubricant having two shorter and/or lighter main chain segments (e.g. boundary lubricant 700 of FIG. 7) may not necessarily come at the expense of increasing evaporation issues. For instance, such a boundary lubricant has two main chain segments and three attachment segments; thus, the overall MW of the lubricant may not be reduced to the point where evaporation is problematic.

Figure 8:
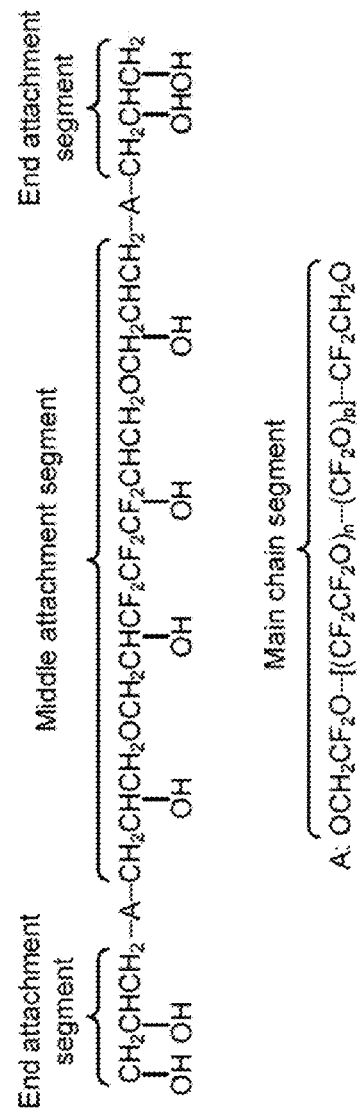
FIG. 8 is a representation of the molecular structure of ZTMD.

One example of a boundary lubricant having the structure shown in FIG. 7 is Z-Tetraol Multidentate (ZTMD). The molecular structure of ZTMD is illustrated in FIG. 8, with annotations specifying the main chain and attachment segments. The "n" and "p" subscripts associated with the $(CF_2CF_2O)_n-$ and $-(CF_2O)_p-$ units in the main chain segment shown in FIG. 8 each individually correspond to integers greater than zero.

Figure 9:
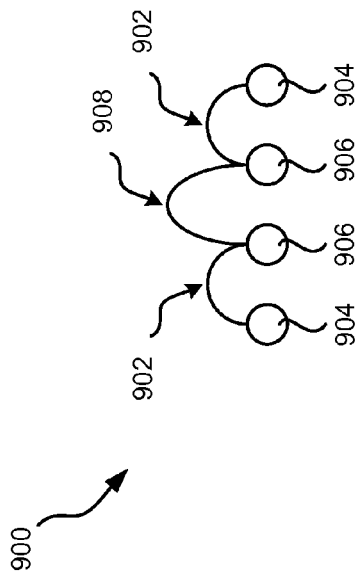
FIG. 9 is a lubricant molecule having three main chain segments and three attachment segments, according to one embodiment.

FIG. 9 illustrates yet another boundary lubricant 900, according to one approach. As shown in FIG. 9, the boundary lubricant 900 includes two outer main chain segments 902, each of which have the same molecular structure. There is an end attachment segment 904 at one end of each outer main chain segment 902, and an inner attachment segment 906 at the other end of each outer main chain segment 902. In various approaches, the molecular structure of the end and inner attachment segments 904, 906 may be the same or different.

The boundary lubricant also includes a middle main chain segment 908. This middle chain segment 908 has a molecular structure that is different from the two outer main chain segments 902. As illustrated in FIG. 9, there are two middle inner attachment segments 906 positioned on either end of the middle main chain segment 908.

In numerous approaches, the MW of the main chain segments (e.g. the outer and/or middle main chain segments 902, 908) in the boundary lubricant 900 may be shorter and/or have a lower MW as compared to the main chain segments of the boundary lubricants shown in FIGS. 5-8. Accordingly, in such approaches the potential for head-disk interaction may be further reduced using the boundary lubricant 900 of FIG. 9 as compared to using the boundary lubricants of FIG. 5-8. Furthermore, as the boundary lubricant 900 of FIG. 9 has three main chain segments and four attachment segments; the overall MW of the lubricant may also not be reduced to the point where evaporation is problematic.

Figure 10:
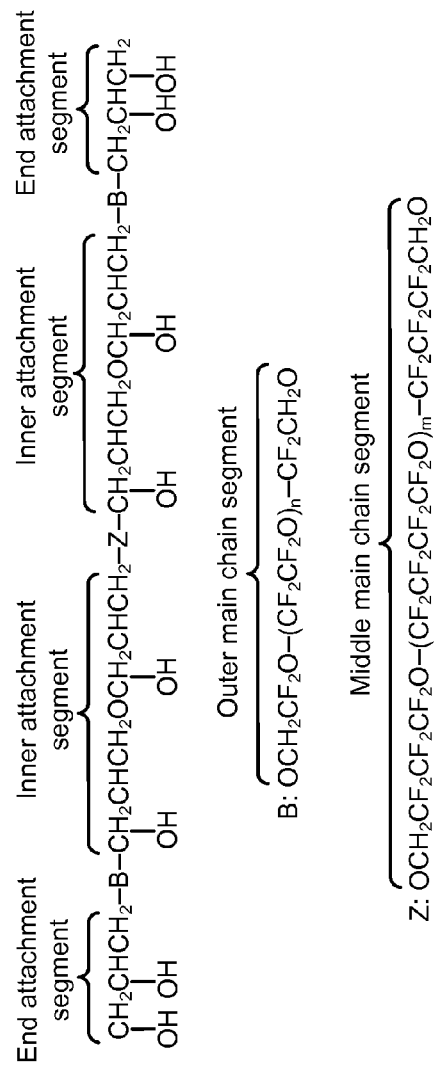
FIG. 10 is a representation of the molecular structure of 24TMD.

One example of a boundary lubricant having the structure shown in FIG. 9 is 24TMD. The molecular structure of 24TMD is illustrated in FIG. 10, with annotations specifying the main chain and attachment segments. As shown in FIG. 10, the end main chain segments each include at least one perfluorobutyl ether unit, $-(CF_2CF_2O)_n-$, where "n" is an integer greater than zero. As also shown in FIG. 10, the middle main chain segment includes at least one perfluorobutyl ether unit, $-(CF_2CF_2CF_2CF_2O)_m-$, where "m" is an integer greater than zero. Higher $CF_2$ content in perfluoropolyalkyl ether units typically results in less rotational degrees of freedom, greater main chain rigidity, and less lubricity (e.g. the ability to reduce friction between moving surfaces) of the overall lubricant.

Figure 11:
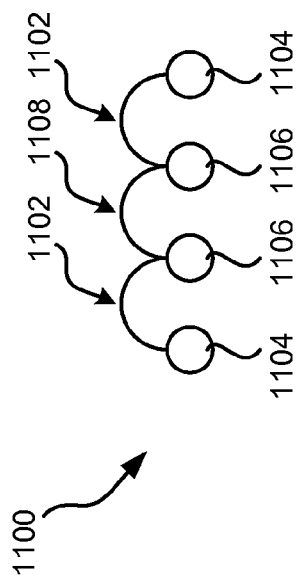
FIG. 11 is a lubricant molecule having three main chain segments and three attachment segments, according to one embodiment.

In preferred approaches, a boundary lubricant has the structure illustrated in FIG. 11. As shown in FIG. 11, the boundary lubricant 1100 includes two outer main chain segments 1102, each of which may have the same molecular structure. There is an end attachment segment 1104 at one end of each outer main chain segment 1102, and an inner attachment segment 1106 at the other end of each outer main chain segment 1102. In various approaches, the molecular structure of the end and inner attachment segments 1104, 1106 may be the same or different. The preferred embodiments overcome the drawbacks associated with the other approaches discussed above.

The boundary lubricant also includes a middle main chain segment 1108. The molecular structures of the middle chain segment 1108 and the two outer main chain segments 1102 are preferably the same. As illustrated in FIG. 11, there are two middle inner attachment segments 1106 positioned on either end of the middle main chain segment 1108.

Figure 12:
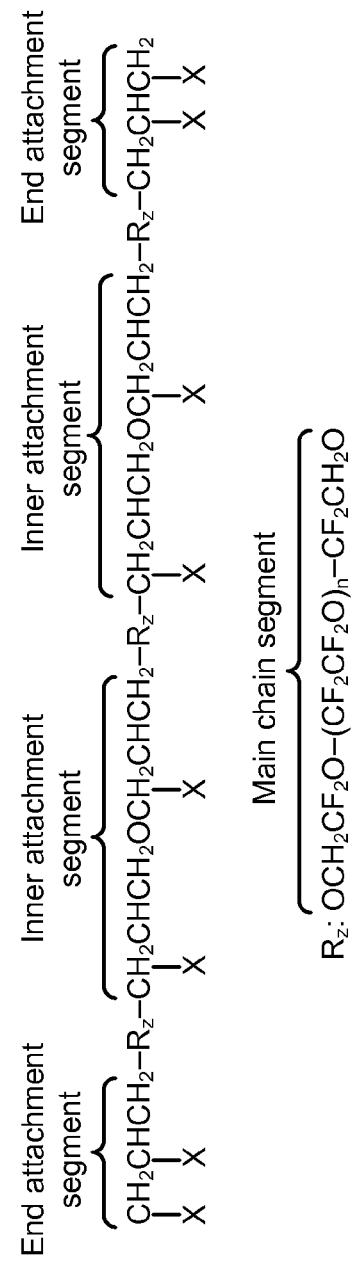
FIG. 12 is a representation of the molecular structure of the lubricant molecule of FIG. 11, according to one embodiment.

A representative molecular structure of the boundary lubricant 1100 of FIG. 11 is shown in FIG. 12, according to one embodiment. As shown in FIG. 12, the end and inner attachment groups each comprise two functional groups X, where each X is configured to attach to a surface to be lubricated. In some approaches, each of the functional groups X may be independently selected from a group consisting of: a hydroxyl group, a piperonyl group, an amine group, a carboxylic acid, a phosphazene group, and a combination thereof. In preferred approaches, each X may be a hydroxyl group.

As shown in FIG. 12, each of the main chain segments ($R_z$) include at least one perfluoroethyl ether unit, $-(CF_2CF_2O)_n-$, where "n" is an integer greater than zero. In various approaches, "n" may be two. A boundary lubricant having the molecular structure shown in FIG. 12 may have a lower $CF_2$ content as compared to 24TMD, which has a main chain segment with at least one perfluorobutyl ether unit. Accordingly, the boundary lubricant of FIG. 12 may be less rigid and have better lubricity than 24TMD.

As used herein in various approaches, a boundary lubricant having the molecular structure shown in FIG. 12, where each main chain segment includes two perfluoroethyl ether units (i.e. $-(CF_2CF_2O)_2-$), and where each X functional group in the end and inner attachment segments is a hydroxyl group, may be referred to herein as 2TMD.

Figure 13:
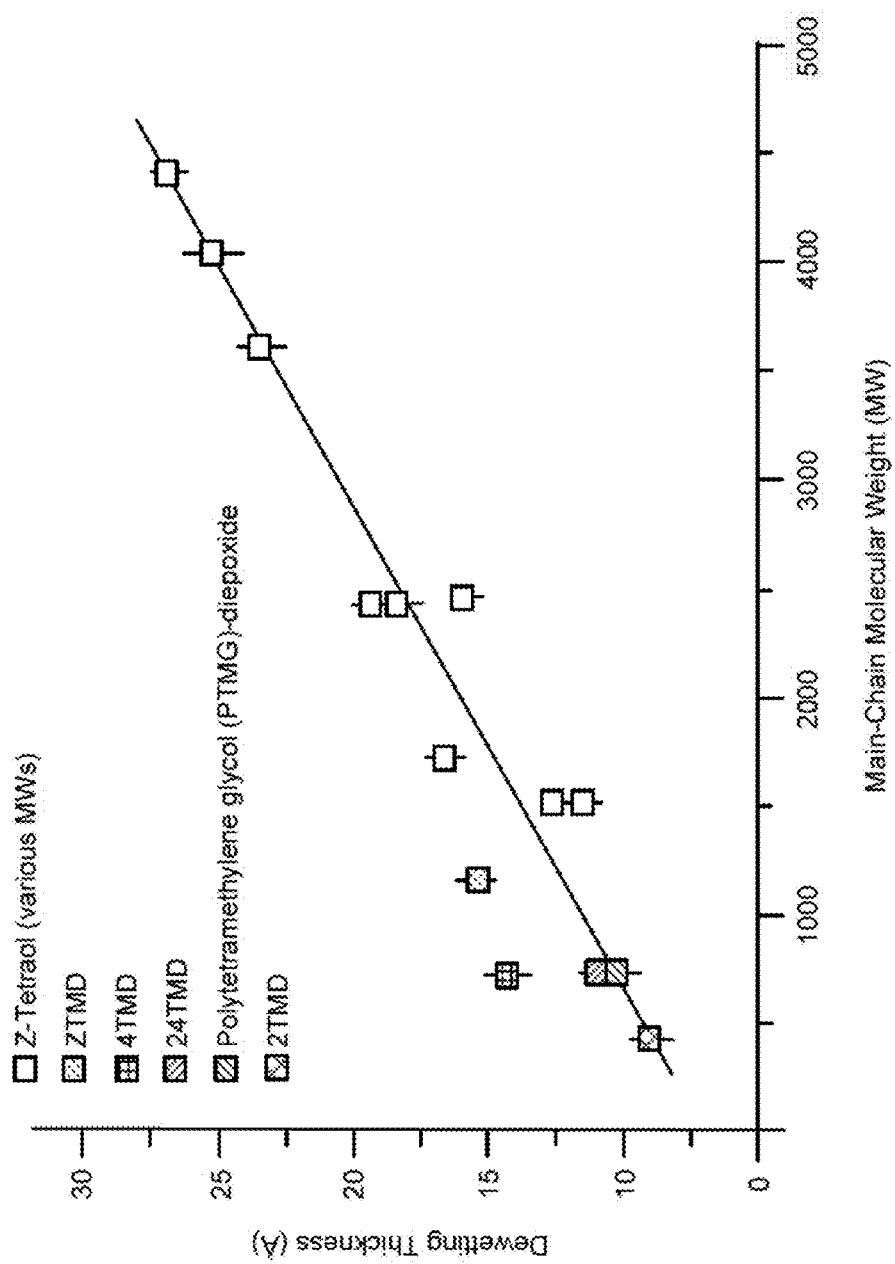
FIG. 13 is a plot of main chain molecular weight versus dewetting thickness for various lubricants.

FIG. 13 illustrates a plot of the average main chain molecular weight (amu) versus dewetting thickness (Å) for 2TMD and various other boundary lubricants, such as those shown in FIGS. 5-10 (e.g. Z-Tetraol, ZTMD, and 24TMD). Other lubricants also shown in FIG. 13 include polytetramethylene glycol diepoxide and 4TMD. 4TMD has a molecular structure similar to 24TMD with the exception that all of the main chain segments (i.e. the two end main chain segments and middle main chain segment) of 4TMD include at least one perfluorobutyl ether unit, $-(CF_2CF_2CF_2CF_2O)_m-$, where "m" is an integer greater than zero. As evidenced by FIG. 13, the average MW of a main chain segment in 2TMD is lower than the average MW of the main chain segments in the other boundary lubricants. Accordingly, the potential for head-disk interactions may be further reduced using 2TMD as compared to using the other boundary lubricants.

As also shown in FIG. 13, 2TMD possesses the lowest dewetting thickness as compared to the other boundary lubricants (e.g. Z-Tetraol, ZTMD, 24TMD, etc.). Dewetting generally refers to instances where a solid or liquid film on a surface retracts from the surface by forming discrete droplets or islands. The dewetting thickness is the thickness of the film at which dewetting occurs.

Moreover, it is important to note that while the average MW of 2TMD's main chain segment may be lower than that for the other boundary lubricants shown in FIG. 13, 2TMD does not necessarily suffer from increased evaporation issues. For instance, as noted above, 2TMD has three main chain segments and four attachment segments; thus, the overall MW of the lubricant may not be reduced at the expense of increasing vapor pressure (evaporation).

Figure 14:
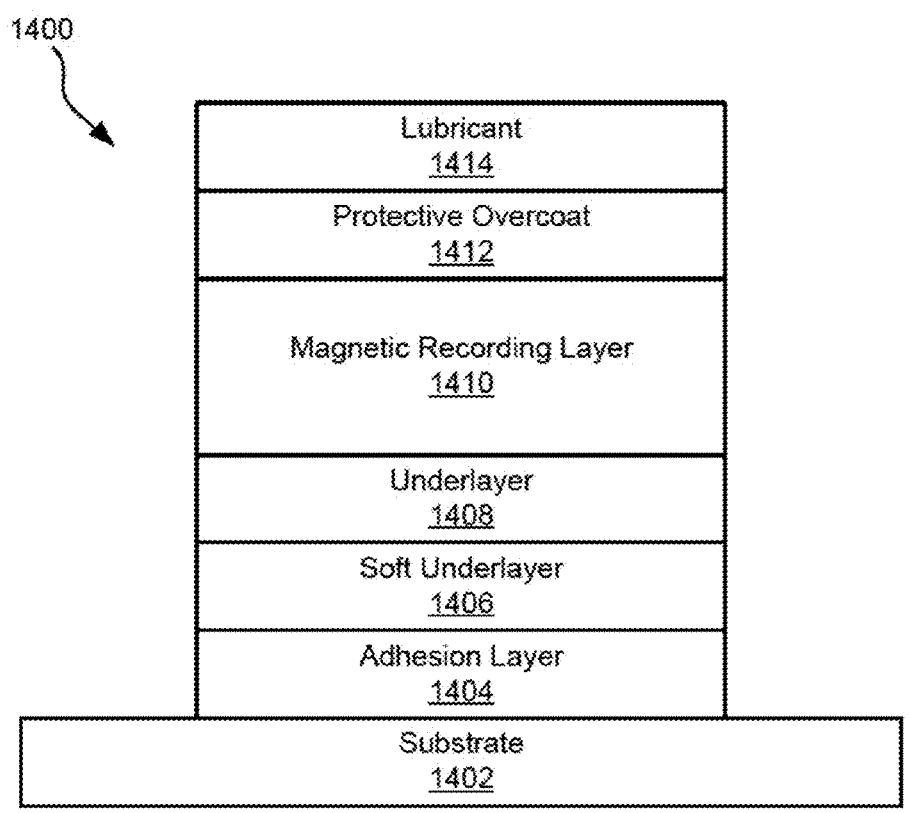
FIG. 14 is a simplified schematic diagram of a magnetic medium according to one embodiment.
Figure 15:
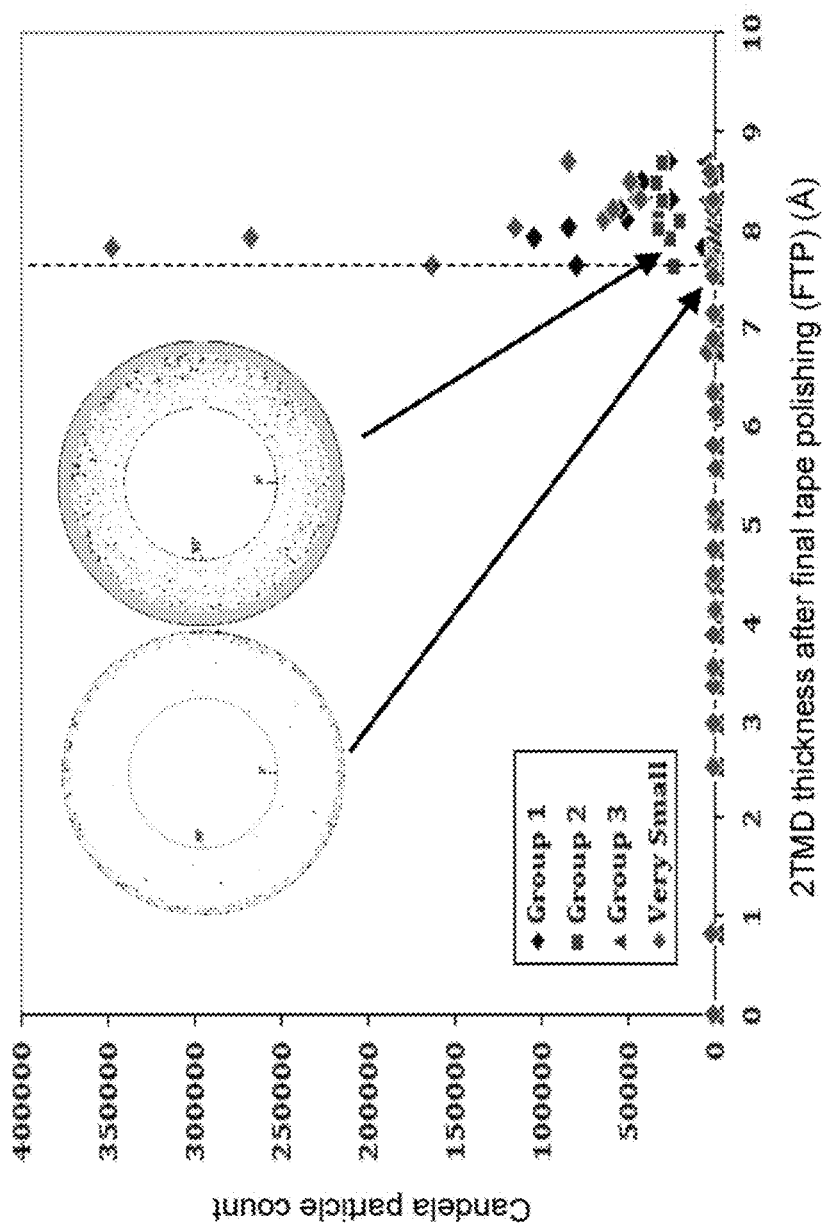
FIG. 15 is a measurement of the dewetting thickness for a 2TMD lubricant layer.

Now referring to FIG. 14, a magnetic medium 1400 having a lubricant layer is shown, according to one embodiment. The magnetic medium 1400 may be any type of magnetic media known in the art, such as a hard disk, a magnetic tape, an optical disk, etc. As an option, the magnetic medium 1400 may be implemented in conjunction with features from any other embodiment listed herein, such as those described with reference to the other FIGS. Of course, the magnetic medium 1400 and others presented herein may be used in various applications and/or in permutations which may or may not be specifically described in the illustrative embodiments listed herein. Moreover, more or less layers than those specifically described in FIG. 14 may be included in the magnetic medium 1400 according to various embodiments.

As shown in FIG. 14, the magnetic medium 1400 may include a non-magnetic substrate 1402 (e.g., a glass substrate), and an adhesion layer 1404 positioned above the substrate 1402. The adhesion layer 1404 is configured to promote coupling of layers formed thereabove. A soft underlayer 1406 is positioned above the adhesion layer 1404 to promote data recording in the magnetic recording layer 1410. Additionally, an underlayer 1408 is positioned above the soft underlayer 1406 to promote formation of the magnetic recording layer 1410 with good magnetic properties. The magnetic recording layer 1410 is positioned above the underlayer 1408 and is configured to record data therein. As also shown in FIG. 14, a protective overcoat 1412 is positioned above the magnetic recording layer 1410 and is configured to protect the magnetic recording layer from wear, corrosion, etc. Finally, the upper surface of the magnetic medium 1400 may be coated with lubricant layer 1414 comprising a boundary lubricant.

In one embodiment, the lubricant layer 1414 may include a multidentate perfluoropolyether boundary lubricant having a molecular structure according to formula (1):

$$R_e\text{—}R_z\text{—}R_i\text{—}R_z\text{—}R_i\text{—}R_z\text{—}R_e. \quad (1)$$

In one approach, $R_z$ (also referred to as an end attachment segment) may include at least one perfluoroethyl ether unit. In some approaches, this at least one perfluoroethyl ether unit may have a molecular structure according to formula (2):

$$\text{—}(CF_2CF_2O)_n\text{—}, \quad (2)$$

where n is an integer greater than zero. In various approaches n may be an integer in a range from 0 to 10. In preferred approaches, n is 2-6.

In another approach, each $R_z$ segment may have a molecular structure according to formula (3):

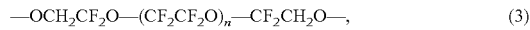
$$\text{—}OCH_2CF_2O\text{—}(CF_2CF_2O)_n\text{—}CF_2CH_2O\text{—}, \quad (3)$$

where n is 1 or 10. In yet more approaches, each $R_z$ segment may have a molecular weight between about 300 amu to about 1350 amu.

In various approaches, each $R_e$ and $R_i$ segment in formula (1) includes at least one functional group configured to attach to a surface (e.g. the protective overcoat 1412 shown in FIG. 14). In one approach, each $R_e$ and $R_i$ segment may include two functional groups configured to attach to a surface. Each of the functional groups present in the $R_e$ and $R_i$ segments may be independently selected from a group consisting of: a hydroxyl group, a piperonyl group, an amine group, a carboxylic acid, a phosphazene group, and a combination thereof, in numerous approaches. In preferred approaches, the functional groups in the $R_e$ and $R_i$ segments may be hydroxyl groups.

In particular approaches, each $R_e$ segment (also referred to an end attachment segment) may have a molecular structure according to formula (4):

(4)

where each X is independently selected from a group consisting of: a hydroxyl group, a piperonyl group, an amine group, a phosphazene group, and a combination thereof.

In yet other approaches, each $R_i$ segment (also referred to as an inner attachment segment) may have a molecular structure according to formula (5):

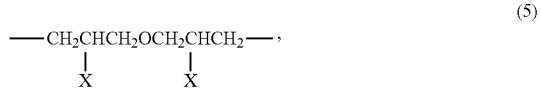

(5)

where each X is independently selected from a group consisting of: a hydroxyl group, a piperonyl group, an amine group, a phosphazene group, and a combination thereof.

In further approaches, the multidentate perfluoropolyether boundary lubricant in the lubricant layer 1414 may have an average MW in a range from about 1000 amu to about 6000 amu.

An exemplary multidentate perfluoropolyether boundary lubricant in the lubricant layer 1414 may have the general molecular structure shown in FIG. 12. In particular approaches, the multidentate perfluoropolyether boundary lubricant in the lubricant layer may be 2TMD, having the molecular formula:

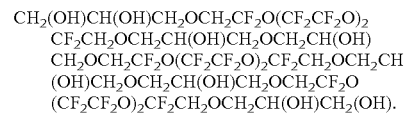

$CH_2(OH)CH(OH)CH_2OCH_2CF_2O(CF_2CF_2O)_2$
$CF_2CH_2OCH_2CH(OH)CH_2OCH_2CH(OH)$
$CH_2OCH_2CF_2O(CF_2CF_2O)_2CF_2CH_2OCH_2CH$
$(OH)CH_2OCH_2CH(OH)CH_2OCH_2CF_2O$
$(CF_2CF_2O)_2CF_2CH_2OCH_2CH(OH)CH_2(OH)$.

2TMD may exhibit various desirable and advantageous physical characteristics and properties such as thickness, uniformity, bonded percentage, clearance, durability, flyability, glide yield, and contamination robustness, as defined in the Comparative Examples described below.

With continued reference to FIG. 14, the thickness of the lubricant layer 1414 may be between about 7 Å to about 8 Å, according to another embodiment.

Again with reference to FIG. 14, the magnetic medium 1400 may be a component in a magnetic data storage system, according to a further embodiment. This magnetic data storage may also include at least one magnetic head, a drive mechanism for passing the magnetic recording medium 1400 over the at least one magnetic head, and a controller electrically coupled to the at least one magnetic head for controlling operation of the at least one magnetic head.

Figure 16:
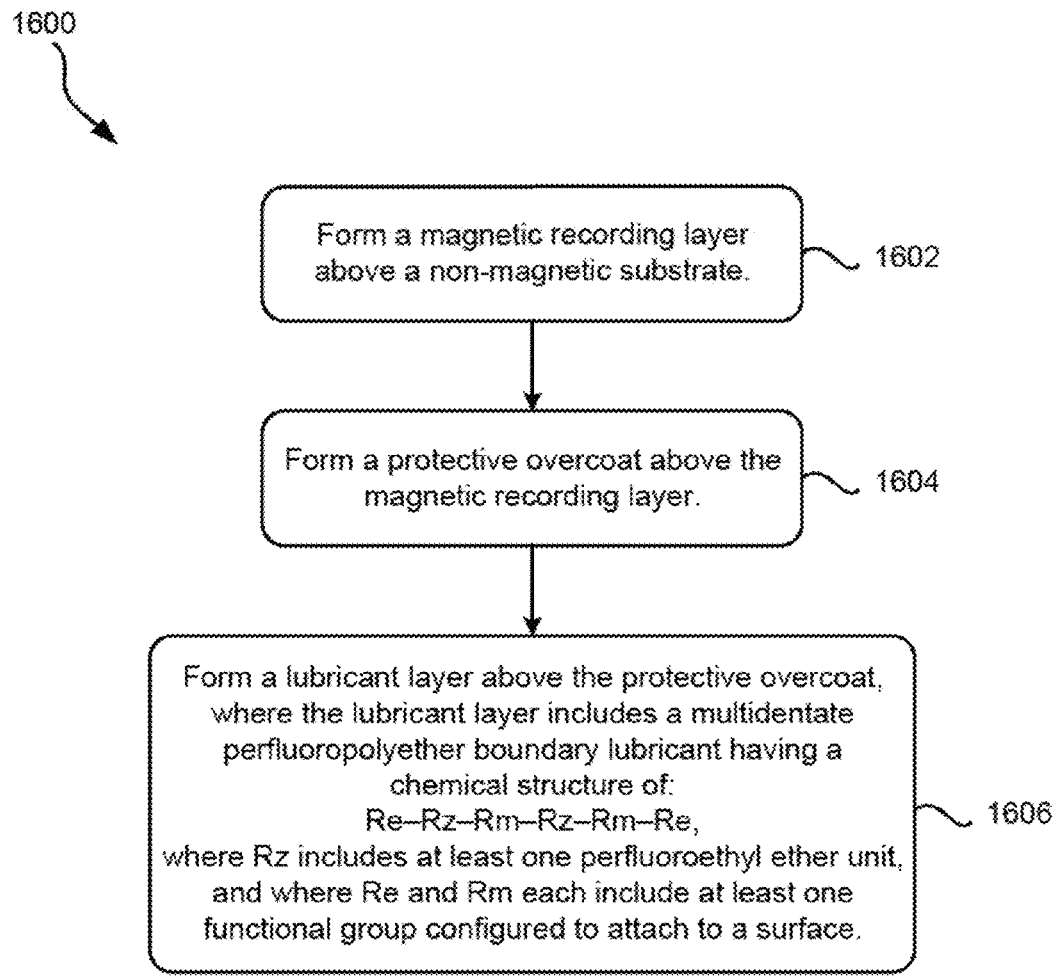
FIG. 16 is a flowchart of a method for forming a magnetic medium having a lubricant layer thereon according to one embodiment.

Now referring to FIG. 16, a method 1600 for forming a magnetic medium having a boundary lubricant is shown according to one embodiment. As an option, the method 1600 may be implemented to construct structures such as those shown in the other figures. Of course, this method 1600 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

As shown in FIG. 16, the method 1600 includes forming a recording layer above a non-magnetic substrate. See operation 1602. In various approaches, the method 1600 may also include forming other layers positioned between the non-magnetic substrate and the magnetic recording layer. These other layers may include, for example, one or more underlayers, soft underlayers, adhesion layers, etc.

As also shown in FIG. 16, the method 1600 includes forming a protective overcoat above the magnetic recording layer. See operation 1604. The method 1600 further includes forming a lubricant layer above the protective overcoat. See operation 1606. This lubricant layer includes a multidentate perfluoropolyether boundary lubricant having a molecular structure according to formula (1) above, where each main chain segment ($R_z$) includes at least one perfluoroethyl ether unit, and where each end and inner attachment segment ($R_e$ and $R_i$, respectively) include at least one functional group configured to attach to a surface to be lubricated. In preferred approaches, the multidentate perfluoropolyether boundary lubricant may be 2TMD.

In various embodiments, the lubricant layer can be formed on the magnetic medium, specifically over the protective overcoat, via a dip coating method. For instance, in one approach, the magnetic medium having the protective overcoat thereon may be dipped into a lubricant bath including the multidentate perfluoropolyether boundary lubricant and a fluorocarbon solvent such as Vertrel-XF. After a predetermined amount of time, the magnetic medium may be removed from the lubricant bath at a controlled rate. The solvent may then evaporate, leaving behind a lubricant layer comprising the multidentate perfluoropolyether boundary lubricant. The percentage of the multidentate perfluoropolyether boundary lubricants remaining on the surface of the magnetic medium after lubrication may refer to the bonded percentage. The bonding percentage may be quantified for various time periods by exposing the lubricated magnetic medium with the solvent used in the lubricant bath.

Figure 17:
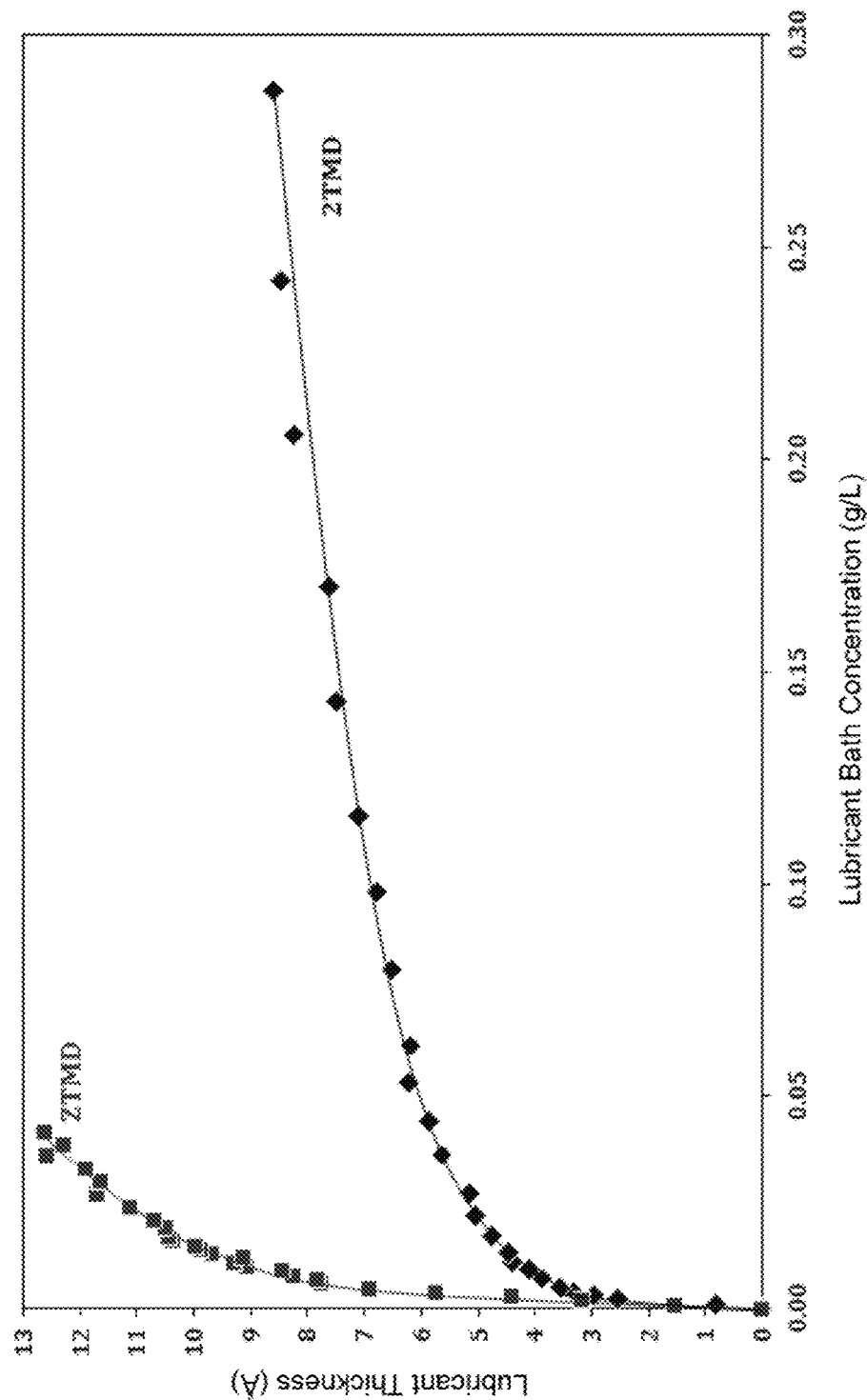
FIG. 17 is a plot of lubricant layer thickness versus lubricant bath concentration for ZTMD and 2TMD lubricant layers.

The thickness of the lubricant layer may be tuned by controlling the submergence duration of the magnetic medium in the lubricant bath, the rate at which the magnetic medium is removed from the coating solution, and/or the concentration of the boundary lubricant (e.g. the multidentate perfluoropolyether boundary lubricant) in the lubricant bath. For example, FIG. 17 illustrates a plot of the lubricant bath concentration versus resulting lubricant thickness for both 2TMD and ZTMD. As shown in FIG. 16, variation of the 2TMD concentration in the lubricant bath may not significantly affect and/or increase the resulting thickness of a 2TMD lubricant layer. In contrast, small variations in ZTMD concentration lead to significant increases in the thickness of a ZTMD lubricant layer. Consequently, the ability to control the thickness and/or uniformity of ZTMD lubricant layer during manufacture may be more difficult as compared to the manufacture of a 2TMD lubricant layer.

In preferred approaches, the concentration of 2TMD in the lubricant bath may be between about 0.1 g/L to about 0.2 g/L. In yet other preferred approaches, the concentration of 2TMD in the lubricant bath may be selected so as to achieve a resulting 2TMD lubricant layer with a thickness between about 7 Å to about 8 Å.

It is important to note that formation of the lubricant layer on the surface of the magnetic medium, specifically on the surface of the protective overcoat, is not limited to dip coating, but may also involve spin coating, spray coating, a vapor deposition, a combination thereof, or any other suitable coating process as would be understood by one having skill in the art upon reading the present disclosure.

Comparative Examples

A lubricant layer having 2TMD is compared/tested relative to a lubricant layer having ZTMD for contamination robustness, bonding percentage, uniformity, clearance, bit error rate improvement, head wear rate, flyability, and glide yield.

For the majority of the comparative examples, a 2TMD layer having a thickness of about 7 Å is compared/tested relative to a ZTMD lubricant layer having a thickness of about 10 Å. Reducing lubricant layer thickness on a magnetic medium is one approach to reduce head-media spacing (e.g. the clearance). However, low lubricant layer thicknesses (e.g. ≤10 Å) are typically associated with several limitations, such as the inability to control uniformity of the lubricant layer during manufacture, lower glide yields, high TFC wear, higher surface energies and thus increased adsorption of chemical contaminants, etc. Yet, it has been surprising and unexpectedly discovered that a 2TMD layer having a thickness of about 7 Å exhibits physical characteristics and properties that are comparable and/or superior to a ZTMD lubricant layer having a thickness of about 10 Å, as evidenced below.

Contamination Robustness

Figure 18:
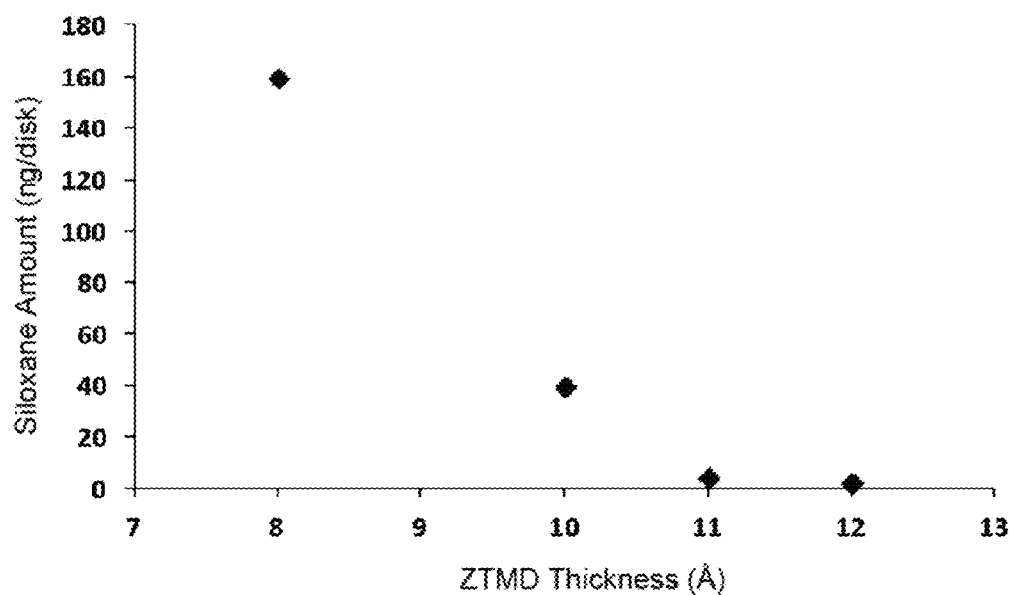
FIG. 18 is a plot of siloxane contamination amount versus lubricant layer thickness for a ZTMD lubricant layer.
Figure 19:
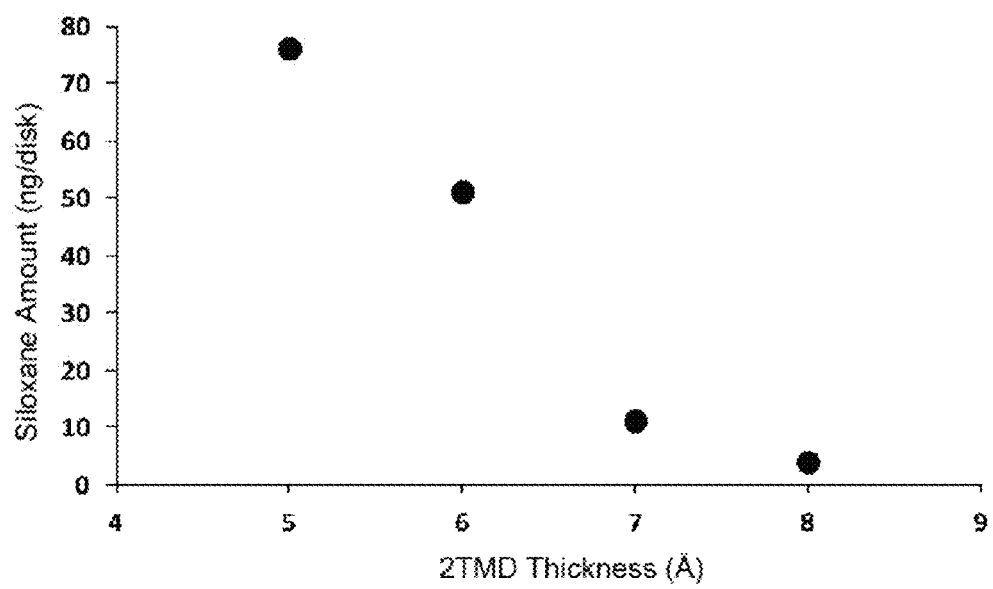
FIG. 19 is a plot of siloxane contamination amount versus lubricant layer thickness for a 2TMD lubricant layer.

Contamination robustness may be quantified by exposing a lubricant layer to contaminants (e.g. organic contaminants, hydrocarbon carbon contaminants, siloxane contaminants, etc.). For example, FIGS. 18 and 19 illustrates thickness of a ZTMD lubricant layer and a 2TMD lubricant layer versus siloxane amount, respectively. Comparison of FIGS. 18 and 19 reveals that the amount of siloxane contamination in the 2TMD lubricant layer at low thicknesses (e.g. below 10 Å) is significantly less than that for the ZTMD lubricant layer. For instance, a ZTMD lubricant layer with 8 Å thickness has a siloxane amount of about 160 ng/disk, whereas a 2TMD lubricant layer with 8 Å thickness only has a siloxane amount of about 5 ng/disk. Accordingly, the thickness of a 2TMD lubricant layer may be reduced to a greater extent than a ZTMD lubricant layer without significantly sacrificing contamination robustness.

Bonding Percentage

Figure 20:
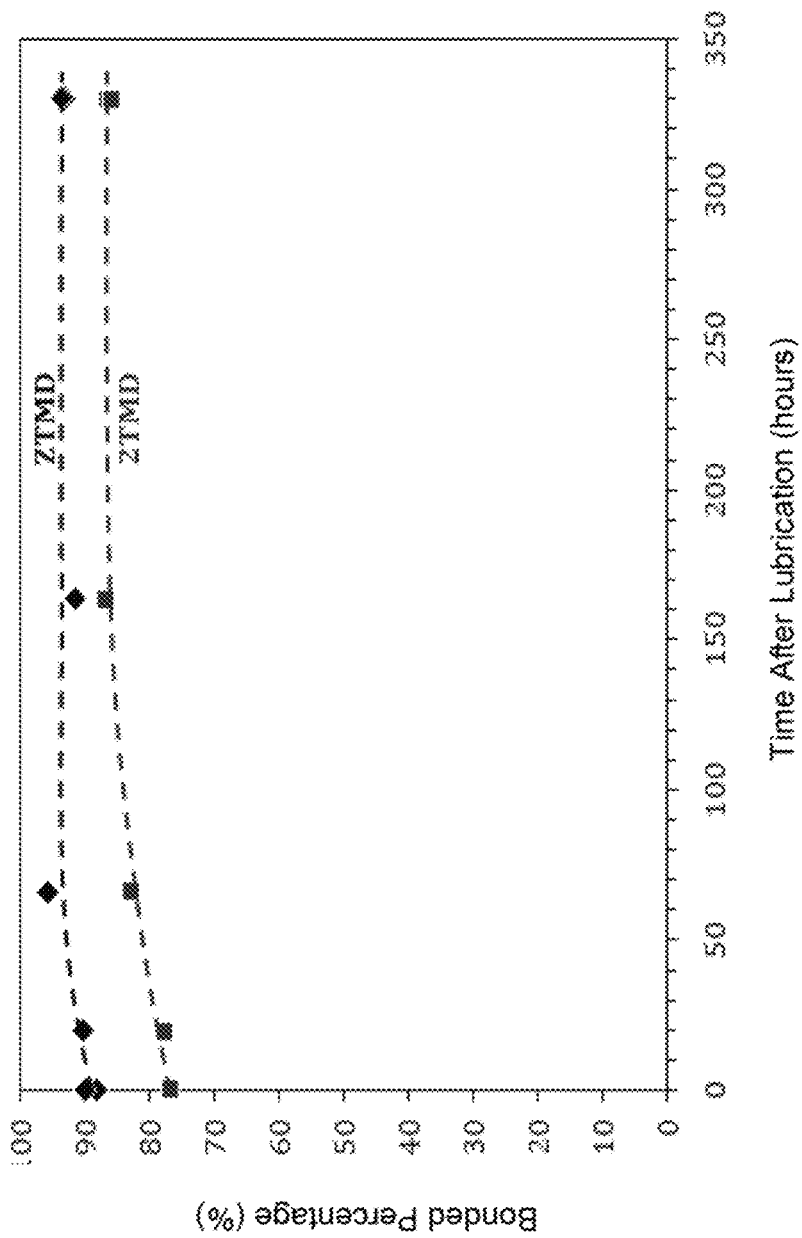
FIG. 20 is a plot showing bonded percentage over a period of time after lubrication for 2TMD and ZTMD lubricant layers.

The percentage of a boundary lubricant remaining on the surface of the magnetic medium after lubrication may refer to the bonded percentage. The bonding percentage may be quantified for various time periods by exposing the lubricated magnetic medium with a solvent used during the lubrication process (e.g. a solvent used in a lubricant bath). As shown in FIG. 20, the bonding percentages of a 2TMD lubricant layer and a ZTMD lubricant layer are comparable over a time period ranging from 0 to about 350 hours after lubrication.

Uniformity

Figure 21:
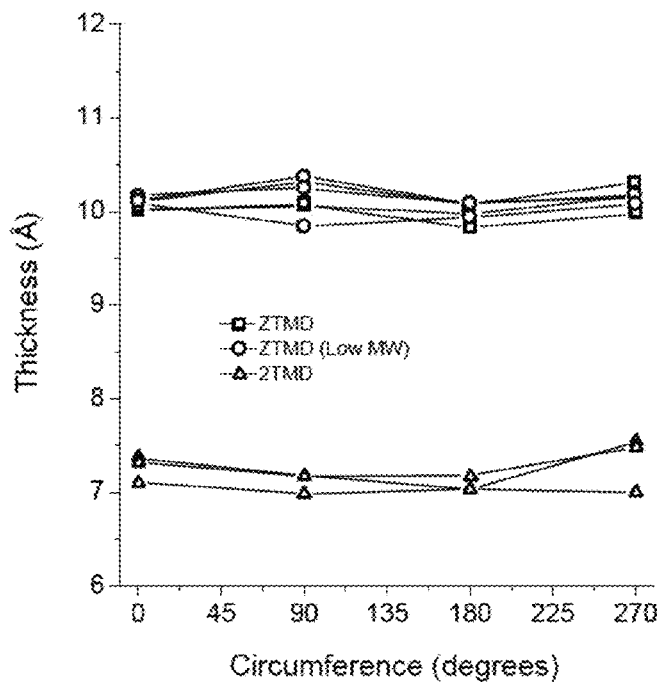
FIG. 21 is a plot showing uniformity results for 2TMD and ZTMD lubricant layers.

As discussed above, achieving a lubricant layer with a low thickness may come at the expense of the layer's resulting uniformity. However, it has been surprisingly and unexpectedly found that the uniformity of a 7 Å thick 2TMD lubricant layer is comparable and/or better than a 10 Å thick lubricant layer having ZTMD or low MW ZTMD. See FIG. 21. For reference low MW ZTMD refers to ZTMD with a MW of about 1650 amu, whereas high MW ZTMD refers to ZTMD with a MW of about 2950 amu. As shown in FIG. 21, uniformity is quantified by measuring the thickness of a lubricant layer at various points on the magnetic medium.

Moreover, it has been also been surprisingly and unexpectedly found that there is a greater ability to control the uniformity of a 2TMD lubricant layer during manufacture (e.g. during lubrication) as compared to a ZTMD lubricant layer. For example, a lubricant layer may be applied to a surface of a magnetic medium by dipping the magnetic medium into a lubricant bath containing the boundary lubricant to be applied and a solvent. The concentration of the boundary lubricant in the lubricant bath may be one factor which affects the resulting thickness of the lubricant layer. As shown in FIG. 17, small changes in ZTMD concentration in the lubricant bath may result in substantial changes in the resulting ZTMD lubricant layer thickness. In contrast, there is less concern about variations in the 2TMD concentration in the lubricant bath, as minor changes may result in only minor changes the resulting 2TMD lubricant layer thickness (e.g. change in thickness of less than about 2 Å over a concentration range from about 0.05 g/L to about 0.275 g/L).

Clearance and Bit Error Rate Improvement

Figure 22:
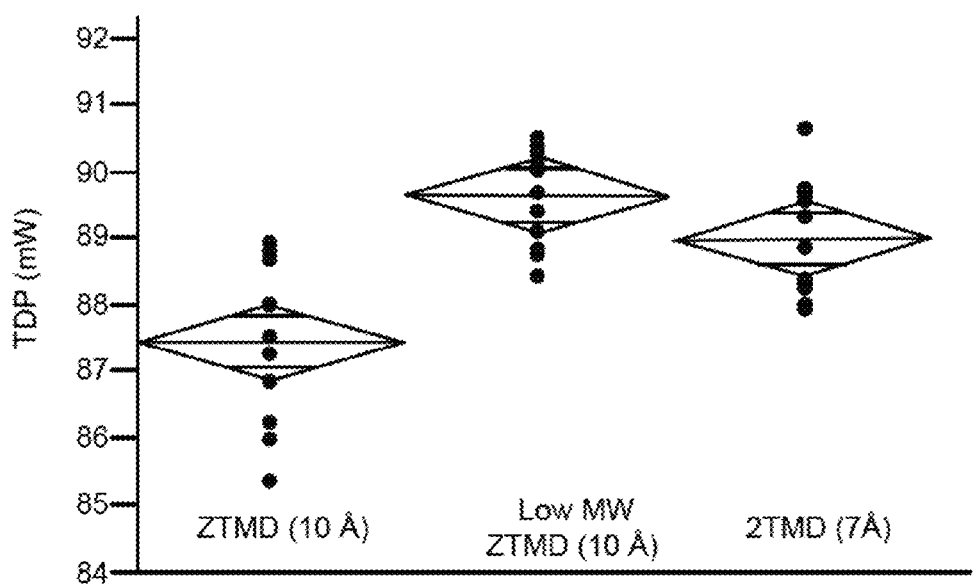
FIG. 22 illustrates an analysis of head-disk clearance associated with disks having 2TMD or ZTMD lubricant layers thereon.

One approach for improving the areal recording density of HDDs involves narrowing the physical head-disk spacing, or clearance. HDDs may use thermal flight control (TFC) technology to reduce head-disk clearance, where a heater controls thermal deformation of one or more portions of the magnetic head to bring it closer to the disk. The heater power required to make the head touch the disk is known as the touch down power (TDP). Accordingly, measuring the TDP provides one way in which to derive the head-disk clearance. FIG. 22 provides several TDP measurements for three different lubricant layers. As shown in FIG. 22, the average TDP power associated with the 7 Å 2TMD lubricant layer is comparable/similar to the average TDP associated with the 10 Å ZTMD lubricant layer and 10 Å low MW ZTMD lubricant layer.

Furthermore, as shown below in Table 1, there is a small bit error rate (BER) advantage associated with spacing.

TABLE 1

| Lubricant | BERaf | TD (nm) |
|---|---|---|
| ZTMD (10 Å) | −1.80 | 7.9 |
| 2TMD (7 Å) | −1.87 | 8.0 |

Head Wear

Figure 23:
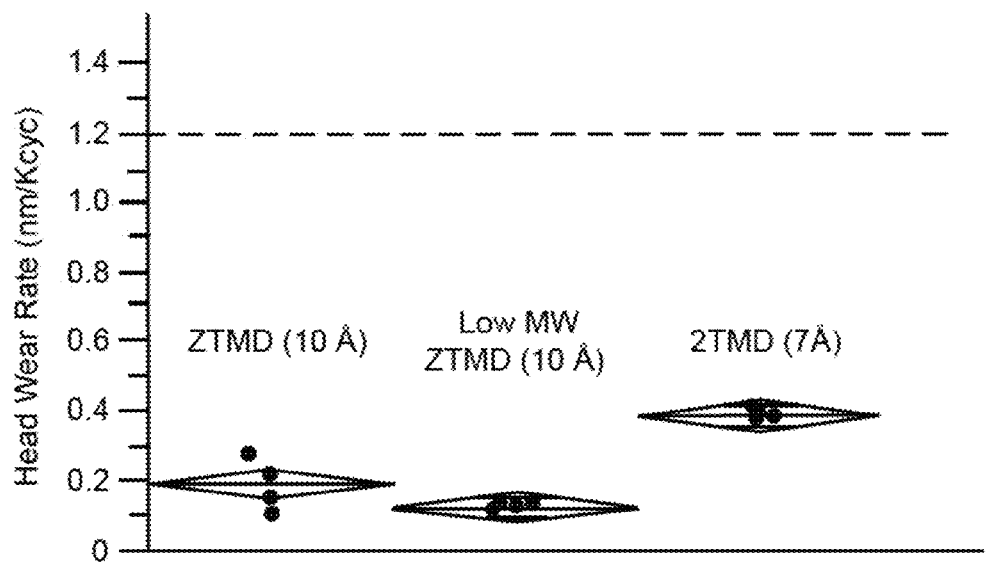
FIG. 23 illustrates an analysis of head wear rate associated with disks having 2TMD or ZTMD lubricant layers thereon.

As discussed previously, a skilled artisan would expect that decreasing the thickness of a lubricant layer would inevitably result in increased head wear. However, it has been surprisingly and unexpectedly found that such is not the case for a 2TMD lubricant layer having a thickness as low as 7 Å. For instance, as shown in FIG. 23, the head wear rate of a 7 Å thick 2TMD lubricant layer is comparable/similar to the head wear rate of a 10 Å thick ZTMD, or low MW ZTMD, lubricant layer. While not shown in FIG. 23, a 7 Å thick ZTMD, or low MW ZTMD, lubricant layer has a head wear rate above the maximum permissible head wear rate specified by the dotted line.

Flyability

Figure 24:
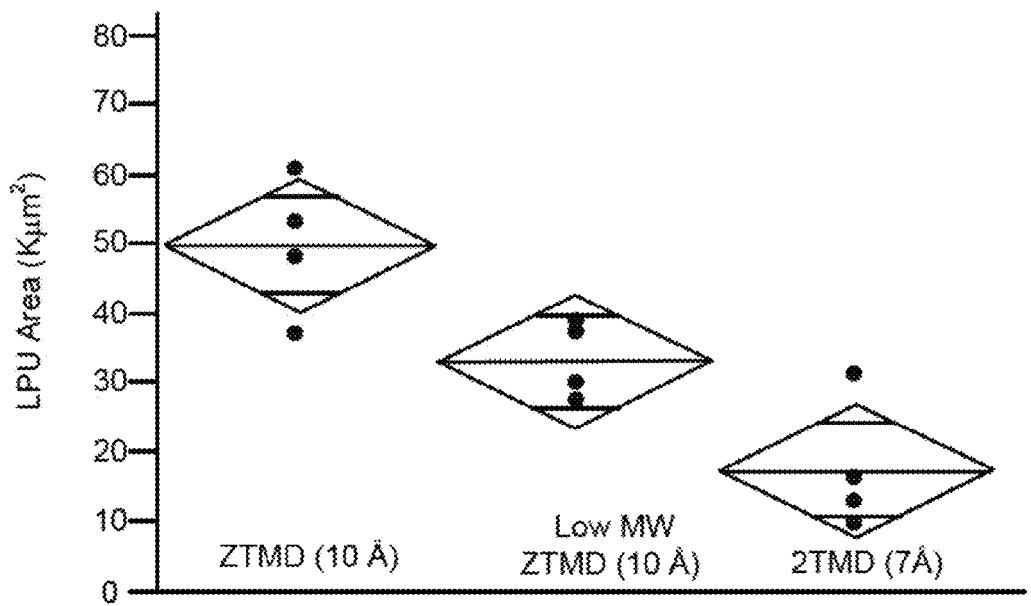
FIG. 24 illustrates a flyability analysis for disks having 2TMD or ZTMD lubricant layers thereon.

Flyability issues may arise where a lubricant accumulates on the head during flying of the head over the disk. Flyability may thus be quantified by measuring lubricant pickup. Flyability data is provided in FIG. 24 for a 7 Å thick 2TMD lubricant layer, a 10 Å thick ZTMD lubricant layer and a 10 Å thick low MW ZTMD lubricant layer. The data shows improvement in flyability with decreased amount of lubricant that was picked up by the slider.

Glide Yield

Glide yield refers to the percentage of disks having a lubricant layer thereon that successfully pass a glide test/process. A disk having a lubricant layer thereon, and which has preferably been subjected to a polishing process, may nevertheless contain defects, such as asperities. Accordingly, during a glide test/process, a head having a piezoelectric sensor thereon flies at a predetermined distance from the disk and senses any asperities that protrude higher than the predetermined head fly height. In the glide tests described herein, this predetermined fly height is 6 nm. A disk having a lubricant thereon which does contain asperities greater than the predetermined fly height is rejected (e.g. does not pass the glide test/process).

Glide yield provides insight into disk surface morphology and the lubricity of the lubricant layer. After a lubricant layer has been applied to a disk, e.g. via a dip coating process, the disk may be polished to remove and/or reduce the presence of any asperities. Where a lubricant layer comprises a boundary lubricant with poor lubricity, this polishing process may not effectively remove and/or reduce asperities and may actually result in additional debris being stuck to the disk surface. Thus, disks having a lubricant layer with poor lubricity will typically have a lower glide yield as compared to disks having a highly lubricious lubricant layer. Glide yield data for a 7 Å thick 2TMD lubricant layer and a 10 Å thick ZTMD lubricant layer are present below in Table 2.

TABLE 2

| Lubricant and target thickness | Average thickness | Glide yield |
|---|---|---|
| ZTMD (10 Å) | 10.08 ± 0.14 Å | 93 |
| 2TMD (7 Å) | 7.21 ± 0.19 Å | 96 |

While not presented in Table 2, it has been discovered by the inventors that a 7 Å thick ZTMD lubricant layer exhibits such poor lubricity that the glide yield is about zero.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A lubricant, comprising:
a multidentate perfluoropolyether according to the formula:

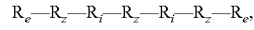

wherein each $R_z$ segment includes at least one perfluoroethyl ether unit,
wherein each $R_e$ and $R_i$ segment includes at least one functional group configured to attach to a surface,
wherein the $R_z$ segments have the same structure as one another.

2. The lubricant as recited in claim 1, wherein the least one perfluoroethyl ether unit is represented by:
—$(CF_2CF_2O)_n$—, wherein n is an integer greater than zero.

3. The lubricant as recited in claim 2, wherein n is 2.

4. The lubricant as recited in claim 1, wherein each $R_z$ segment has a molecular weight between about 300 amu to about 1350 amu.

5. The lubricant as recited in claim 1, wherein the at least one functional group is selected from the group consisting of: a hydroxyl group, a piperonyl group, an amine group, a carboxylic acid, a phosphazene group, and a combination thereof.

6. The lubricant as recited in claim 1, wherein the multidentate perfluoropolyether includes eight functional groups configured to attach to a surface.

7. The lubricant as recited in claim 1, wherein each $R_z$ segment is represented by:
—$OCH_2CF_2O$—$(CF_2CF_2O)_n$—$CF_2CH_2O$—, wherein n is an integer ranging from 1 to 10.

8. The lubricant as recited in claim 1, wherein each $R_e$ segment is represented by:

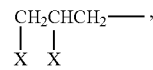

wherein each X is independently selected from the group consisting of: a hydroxyl group, a piperonyl group, an amine group, a phosphazene group, and a combination thereof.

9. The lubricant as recited in claim 1, wherein each $R_i$ segment is represented by:

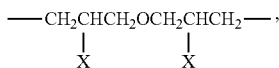

wherein each X is independently selected from the group consisting of: a hydroxyl group, a piperonyl group, an amine group, a phosphazene group, and a combination thereof.

10. The lubricant as recited in claim 1, wherein the $R_e$ segments have the same structure as one another.

11. The lubricant as recited in claim 1, wherein the $R_i$ segments have the same structure as one another.

12. A method for forming a magnetic medium, the method comprising:
   forming a magnetic recording layer above a non-magnetic substrate;
   forming a protective overcoat above the magnetic recording layer; and
   forming a lubricant layer above the protective overcoat, wherein the lubricant layer comprises the multidentate perfluoropolyether as recited in claim 1.

13. The method as recited in claim 12, wherein formation of the lubricant layer over the protective overcoat comprises dipping the magnetic medium having the protective overcoat thereon into a lubricant bath, wherein the lubricant bath comprises the multidentate perfluoropolyether and a solvent.

14. The method as recited in claim 12, wherein a concentration of the multidentate perfluoropolyether in the lubricant bath is between about 0.1 g/L to about 0.2 g/L.

15. A lubricant, comprising:
   a multidentate perfluoropolyether according to the formula:

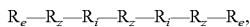

wherein $R_z$ includes at least one perfluoroethyl ether unit, wherein $R_e$ and $R_i$ each include at least one functional group configured to attach to a surface,
   wherein the multidentate perfluoropolyether includes eight functional groups configured to attach to a surface,
   wherein the eight functional groups are hydroxyl groups.

16. A magnetic medium, comprising:
   a magnetic recording layer positioned above a non-magnetic substrate;
   a protective overcoat positioned above the magnetic recording layer; and
   a lubricant layer positioned above the protective overcoat, the lubricant layer comprising a multidentate perfluoropolyether according to the formula:

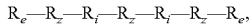

wherein $R_z$ includes at least one perfluoroethyl ether unit,
   wherein $R_e$ and $R_i$ each include at least one functional group configured to attach to a surface,
   wherein the multidentate perfluoropolyether includes eight functional groups configured to attach to a surface, wherein the eight functional groups are hydroxyl groups.

17. The magnetic medium as recited in claim 16, wherein the least one perfluoroethyl ether unit is represented by:
   —$(CF_2CF_2O)_n$—, wherein n is an integer greater than zero.

18. The magnetic medium as recited in claim 16, wherein $R_z$ is represented by:
   —$OCH_2CF_2O$—$(CF_2CF_2O)_n$—$CF_2CH_2O$—, wherein n is an integer ranging from 1 to 10.

19. The magnetic medium as recited in claim 16, wherein $R_e$ is represented by:

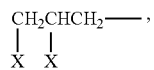

wherein each X corresponds to one of the hydroxyl groups.

20. The magnetic medium as recited in claim 16, wherein $R_i$ is represented by:

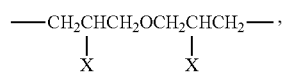

wherein each X corresponds to one of the hydroxyl groups.

21. The magnetic medium as recited in claim 16, wherein a thickness of the lubricant layer is between 7 Å to 8 Å.

22. The magnetic medium as recited in claim 16, wherein the multidentate perfluoropolyether exhibits a bonded percentage of at least 75%.

23. The magnetic medium as recited in claim 16, wherein the lubricant layer having a thickness of between 7 Å to 8 Å includes less contaminants than an otherwise identical layer comprised of Z-Tetraol Multidentate (ZTMD).

24. A magnetic data storage system, comprising:
   at least one magnetic head;
   the magnetic recording medium as recited in claim 16;
   a drive mechanism for passing the magnetic recording medium over the at least one magnetic head; and
   a controller electrically coupled to the at least one magnetic head for controlling operation of the at least one magnetic head.

* * * * *